United States Patent [19]

Wheeler

[11] E Re. 29,898

[45] Reissued Feb. 6, 1979

[54] SELF-SEALING CONTAINER CLOSURE

[75] Inventor: Richard A. Wheeler, Houston, Tex.

[73] Assignee: Ball Corporation, Muncie, Ind.

[21] Appl. No.: 762,081

[22] Filed: Jan. 24, 1977

Related U.S. Patent Documents

Reissue of:

[64] Patent No.: 3,952,910
Issued: Apr. 27, 1976
Appl. No.: 610,354
Filed: Sep. 4, 1975

[51] Int. Cl.[2] ..... A47G 19/22

[52] U.S. Cl. ..... 220/90.4; 229/7 R

[58] Field of Search ..... 220/90.4, 90.2, 90.6, 220/202, 203, 254, 305, 7 R; 229/7 R

[56] References Cited

U.S. PATENT DOCUMENTS

| | | | |
|---|---|---|---|
| 2,800,244 | 7/1957 | Witt | 220/254 |
| 3,015,411 | 1/1962 | Smith | 220/90.4 |
| 3,301,459 | 1/1967 | Gardner | 229/7 R |
| 3,360,161 | 12/1967 | Smith | 220/90.4 |
| 3,360,169 | 12/1967 | Smith | 220/90.4 |
| 3,727,808 | 4/1973 | Fitzgerald | 220/90.4 X |
| 3,730,399 | 5/1973 | Dibrell | 220/90.4 X |
| 3,797,696 | 3/1974 | Dibrell | 220/90.4 |
| 3,905,512 | 9/1975 | Albert et al. | 220/90.4 |

*Primary Examiner*—William Price
*Assistant Examiner*—Steven M. Pollard
*Attorney, Agent, or Firm*—Gilbert E. Alberding

[57] ABSTRACT

A novel self-sealing container closure that prevents spillage and that simultaneously permits drinking from a container or cup, all without the removal of the closure. The novel closure comprising a generally resilient central face having an aperture therethrough defined by overlapping edges, and a skirt extending from the periphery of the central face, said skirt having an integral engaging means formed as the inner face of the skirt for seating engagement with a rim portion of a container, said means including a skirt bead, said bead being formed into two connecting sections, one section being disposed in one plane and the other section being disposed in a second plane, said planes intersecting at an acute angle. The function of said two connecting sections in combination with the other recited features herein is to present a constant tensioning action for suitable sealing engagement of the edges of the aperture when loaded or affixed to the rim of the container or cup.

18 Claims, 6 Drawing Figures

SELF-SEALING CONTAINER CLOSURE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to improvements in self-sealing container closures, and more particularly to novel lid structures capable of being used to cover containers and the like used to carry or transport a liquid, solid or semi-solid commodity while held in the hand yet having means readily available for reaching said commodity for consumption, although the invention will have other uses and purposes as will be apparent to one skilled in the art.

2. Description of the Prior Art

A problem generally exists in that if a container is opened and the lid removed just prior to use or consumption by a user there is a possibility of accidental spilling or sloshing out of the contents. This often takes place when transportation is concerned, either in carrying a filled container or in handling a filled container or cup when traveling aboard a vehicle. In order to overcome this hazard of spillage oftentimes it is common practice to place a lid over the container and simply punch a suitable hole in the lid so that a straw may be inserted therethrough. This practice is not desirable and practical for hot liquids including tea and coffee for a number of reasons including the fact that an inserted straw becomes flat and unusable in a short period of time. Other container closures have been proposed to overcome these difficulties and undesirable features but have not been practical.

Although a number of related devices are known the prior art that has been found to be closest to the present invention is U.S. Pat. No. 3,301,459 to Gardner which relates to a closure for drinking containers. However, this patent does not disclose the several special features of the subject invention including particular biasing means employing two spaced apart rim-engaging members which provide a totally tensioned or loaded closure configuration which serve to maintain and repeatedly establish a continuous sealing relation of the opening. It is often observed that the use of such prior art drinking closures does not provide a lid configuration that can be repeatedly used without the loss of the sealing characteristics of the closure. When the user relies upon the mere resilience of the material to reengage the sealing member, it is often found that through several uses the memory of the resilient portion is not retained resulting in a reduced or poor sealing engagement of the opening itself. This particular disadvantage among others is readily overcome by the subject invention.

SUMMARY OF THE INVENTION

This invention provides an article of manufacture for self-sealing a container or the like without the need of special implementing means. The present invention, in particular, relates to a novel self-sealing container closure comprising a rim-engaging skirt attached to fit snugly on a container, a central face situated proximate said rim-engaging skirt, a section connecting said rim-engaging skirt to said central face and having an aperture therein defined by overlapping edges, and means associated with said rim-engaging skirt for biasing said face upwardly from the container to maintain the overlapping edges of the section in a sealing relationship when said face is not being subjected to displacement and separating said edges when said face is subjected to displacement. Further, in accordance with this invention the biasing means incorporate two cooperating and interrelated members. In particular, the biasing means comprise first and second members affixed to said rim-engaging skirt, said first member being disposed in a first plane and said second member being disposed in a second plane, said planes intersecting and subtending an acute angle when the closure is not secured to the container and parallel and coextensive with one another when the closure is secured to the container.

An object of this invention is to provide a closure for drinking containers, a closure that prevents spillage and that also permits drinking therefrom, all without removal of said closure.

It is a further object of this invention to provide a means for making a container spillproof wherein such means does not have to be removed when the user wishes to consume or imbibe from said container.

It is another object of this invention to provide a closure for drinking containers, a closure that includes a biasing action that maintains a relatively uniform tension throughout the closure so that said closure will repeatedly provide sealing means over long usages without the problem of spilling the contents therefrom.

A still further object of the instant invention is to provide a spillproof drinking container closure which is capable of being used with existing drinking containers so as to prevent the change or alteration of the present construction of such containers.

A still further object of the subject invention is to provide a self-sealing container closure which is sturdy in construction, light in weight, economical in price, and relatively simple to manufacture.

The various objects and features of this invention will be fully understood from the following detailed description of the typical preferred forms and applications thereof, throughout which description references are made to the accompanying drawings.

DETAILED DESCRIPTION

Figure 1:
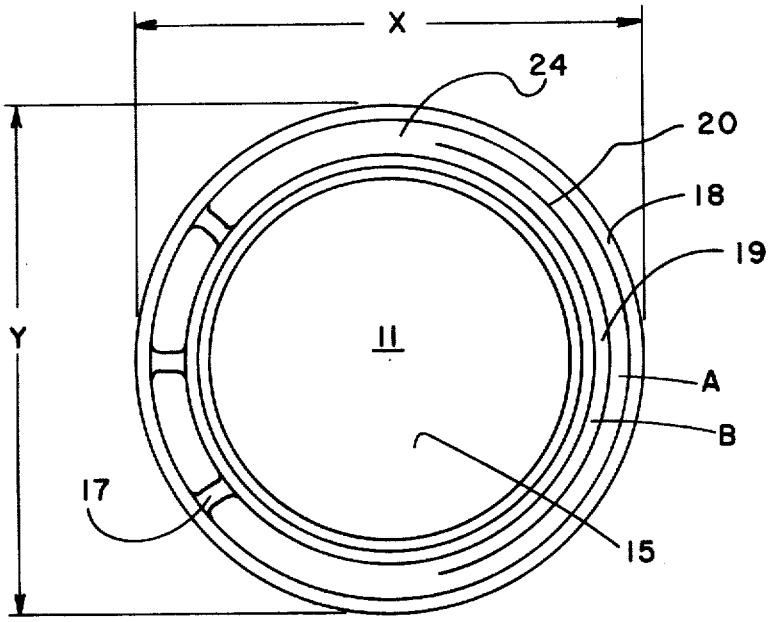
FIG. 1 is a top view of the self-sealing container closure embodying principles of the instant invention.

As shown in FIG. 1 of the drawings a closure 11 is provided with an aperture 20. The apparatus 20 is arcuate in shape and is perpendicular to the plane of the central face 15. In a preferred embodiment the aperture 20 extends slightly less than a half circle and separates the closure 11 into two related portions, a movable portion 19 provided with an edge B and a stationary portion 18 having an edge A. The aperture 20 is formed by the edges A and B, the edges being in an abutting or adjoining relationship when the closure is not affixed to a container or cup 10. It will be appreciated and become apparent from the description to be given hereinafter that this relationship will be changed to one whereby the edges A and B overlap to form a tight seal when the closure is affixed or loaded upon the container. In effect, the overlapping is such that edge B of the movable portion is brought beneath the edge A of the stationary portion. This relationship is readily accomplished by making the mouth of the closure non-circular in form, or put otherwise by making the closure out-of-round. This aspect can be further viewed with reference to FIG. 1 of the drawings in which it is illustrated an outside dimension x of the closure 11 which, in effect, bisects the aperture 20 and represents the approximate outside dimension of the container which is slightly greater than the outside dimension y running at right angle to said x dimension. In practice, and only for mere illustration, the x dimension would, for example, be 3.03 inches and the y dimension would be 3.00 inches. Thus, the mouth configuration assumes a slight ellipse-like form when not placed upon or affixed to the container with the edges A and B being in abutting relationship. It will be appreciated that when the closure is being affixed to a container that the dimension x which conforms to the size of the rim of the container is easily placed thereover whereas the shorter dimension y would require a very slight extension or stretching action to reach and properly engage the rim of the container. The net effect of this is to produce an overlapping relationship of the edges A and B when the closure is placed on the container.

Aside from the overlapping relationship accomplished by the slight ellipse-like form of the mouth of the closure the subject invention provides in combination a tensioning mechanism which maintains a relative constant biasing effect upon the closure structure so that the edges A and B are maintained in this fixed or sealing relationship until a sufficient force is exerted or applied to the movable portion 19.

Figure 4:
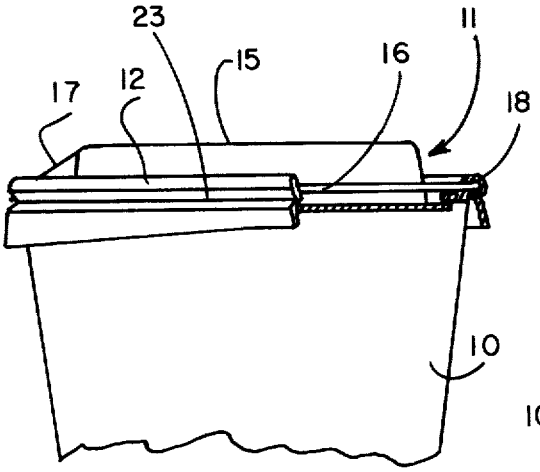
FIG. 4 is a view of the lid affixed or loaded to a container.
Figure 5:
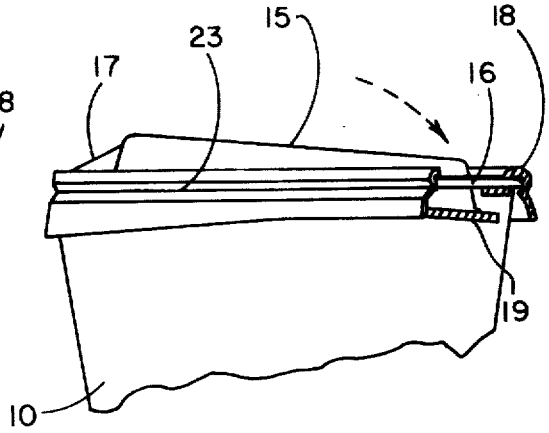
FIG. 5 is a similar view of the closure affixed to the container showing the relative movement of the closure lid.

With reference to FIGS. 4 and 5 of the drawings, the subject invention is shown in operative association with the container or cup 10, or similar form of a container often used in the carryout trade. Usually a container of this character is made of plastic, paper, paper board, or the like, and is provided with an outwardly turned or rolled rim bead 16 around the mouth end of of the container.

Figure 2:
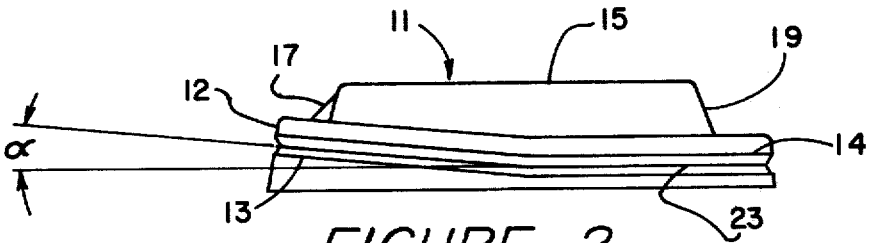
FIG. 2 is a side view of said closure alone showing one embodiment.
Figure 6:
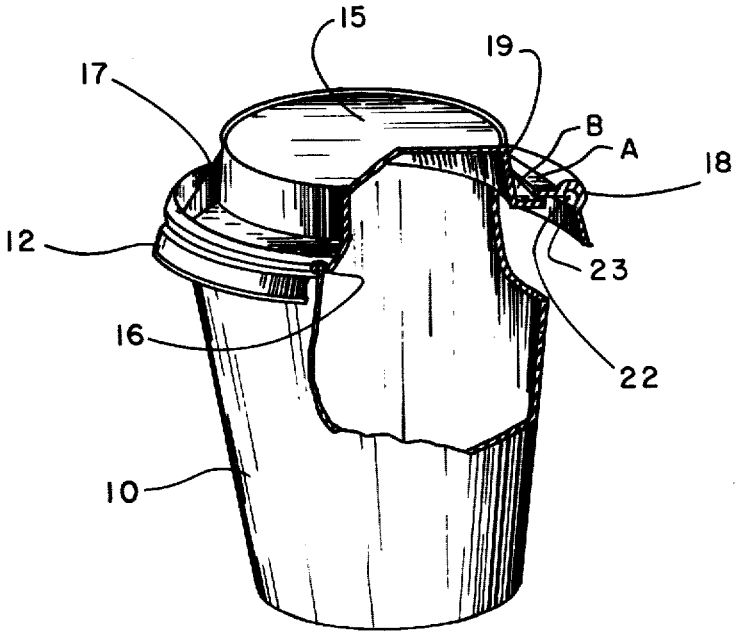
FIG. 6 is a cut-away perspective view of the subject closure showing a detailed structure thereof.

In referring to the drawings there may be seen an embodiment of closure 11 as adapted to be placed upon the container 10 and, in particular, FIG. 2 which depicts a first illustrated embodiment of the instant invention. Here the self-sealing closure is shown which comprises a rim-engaging skirt 12 provided with integral first and second members 13 and 14, respectively, disposed in the inside surface of the skirt 12. As shown in more detail in FIG. 6 the members combine to form essentially a bead-engaging element 23 that extends along the internal skirt portion and is evenly spaced from the top of the stationary portion 18. The bead-engaging element 23 when viewed normal to the central face 15 of the closure 11 assumes a substantially circular or ellipse configuration and is distinguishable as first and second members which are affixed to the rim-engaging skirt and provide an axially disposed channel 22 for reception and engagement with the rim bead 16 of the container 10. In effect, the ends of the two half, substantially circular members are joined and define an elliptical form when the closure is not attached to the container yet is substantially circular when affixed or loaded to the container. Further, the rim bead 16 is generally gripped thereover by the bead-engaging element 23 to provide a snugly fitting closure. Thus, as can be seen the first member 13 is joined to the second member 14 which, like the first member, combine to form the bead-engaging element which extends around the periphery part of the inner face of skirt 12. Again, the members are provided with channel 22, the channel itself being substantially an inverted U-shaped opening.

Figure 3:
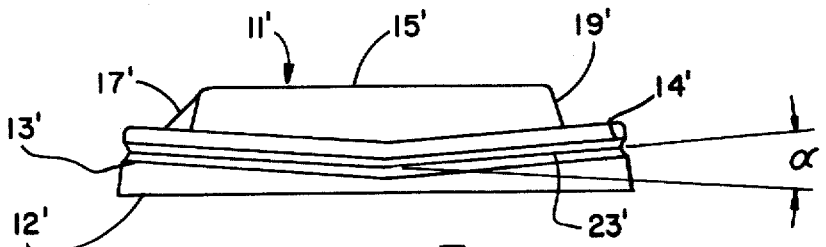
FIG. 3 is another side view of the subject closure alone showing another embodiment.

As visualized from FIG. 2, the first member 14 is disposed in an imaginary first plane, said first plane being parallel to a central face 15 and the second member 13 being disposed in an imaginary second plane, the second plane in this particular embodiment being inclined and not parallel to the central face 15. With reference to FIG. 2 of the drawings this relationship forms an L-like structure on the skirt. In viewing FIG. 3 of the drawings there is shown another embodiment of the subject invention, a first member 14' and a second member 13'. The members here are both inclined inwardly from the central face 15' and form a more or less V-like form on the skirt. Again, as visualized from FIG. 3, the first member 14' is disposed in a first plane, said plane being slightly inclined from the central face 15' and the second member 13' being disposed in a second plane, the second plane in this embodiment being also inclined and not parallel to the central face. It is apparent from these embodiments that the planes do intersect along a line that falls upon or forms a major chord that pass through a center or point on a line passing through the foci of the circular or ellipse-like closed curve formed by the bead-engaging element and that the imaginary first and second planes intersect and subtend an acute angle. This acute angle is shown as angle $\alpha$ in FIGS. 2 and 3 herein. The acute angle formed thereby is generally between 0.5° and 20° and preferably between 0.5° and 5°.

The closure is provided with a slight recess or well-liked depression 24 between said central face 15 and the stationary portion 18. Generally the aperture is located therein and at the base thereof and assumes an annular appearance. Although the recess may be only slight it serves to engage with the user's upper lip for normal and comfortable drinking purposes. As an added feature a small span or connecting means may be employed to bridge across the aperture at or near the midpoint to facilitate stacking of the containers.

In use, when a user places a container provided with the subject closure in a normal drinking position his lips or in some cases his nose come in direct contact with the movable portion or central face so as to cause said portion or face to move inwardly to render a drinking or consuming area. The contents are then free to be embibed or consumed by the user. When the user is finished the removal of his lips causes the portion or face to immediately return to sealing engagement due to the biasing means hereinabove described.

Upon turning the container upside down or on its side the contents such as a fluid do not issue or spill out due to the overlapping edges, stationary portion A supporting and holding the movable portion B in place and movable portion B being urged upwardly and firmly against portion A via the constant biasing action of the subject closures when loaded or affixed to the container rim as hereindescribed.

In accordance with this invention the closure may be provided with one or any number of ribs or bridges 17 which aid to give structural stability to the closure. It should be mentioned that the self-sealing closure herein disclosed is one of rugged durability and may be often reused.

A special feature of the subject disclosure is that the closure is readily reusable and that such closure is easily removable and replaceable for similar containers or cups. Thus, it will be appreciated from the foregoing that the subject lid closure illustrated and described may be readily removed and replaced upon a wide variety of containers or cups. Moreover, the subject closure may readily be formed by conventional methods known to those skilled in the art. Admittedly, the design itself is one that lends itself well to mass production.

Although several embodiments of my invention have been shown, it is understood that it is not intended to be exhaustive nor limiting of the invention, but on the contrary, is given for purposes of illustration in order that others skilled in the art may fully understand the invention and the principles thereof, and the manner of applying it in practical use so that they may modify and adapt it in various forms, each as may be best suited to the conditions of a particular use, and still be within the scope of my invention.

I claim:

1. A self-sealing container closure comprising:
- a central face having an aperture therethrough defined by overlapping edges,
- a skirt extending from the periphery of the central face, said skirt having an integral engaging means formed on the inner face of the skirt for seating engagement with a rim portion of a container,
- said means including an integral skirt member, said member having two adjacent sections, one section being disposed in one plane and the other section disposed in a second plane, said planes intersecting at an acute angle.

2. A self-sealing container closure as recited in claim 1 wherein the integral skirt member is a closed curve and assumes an elliptical configuration.

3. A self-sealing container closure as recited in claim 1 wherein said acute angle is between about 0.5° and 20°.

4. A self-sealing container closure as recited in claim 1 wherein the aperture is arcuate and is less than a half circle.

5. A self-sealing container closure comprising:
- a generally central face having an aperture therethrough defined by overlapping edges,
- a skirt extending from the periphery of the central face, said skirt having an integral bead engaging means formed on the inner face of the skirt for seating engagement with a rim portion of a container,
- said integral bead engaging means comprising a first section disposed in a first plane and a second section disposed in a second plane, said planes intersecting and subtending an acute angle when the closure is not secured to the container and parallel or coextensive with one another when the closure is secured to the container.

6. A self-sealing container closure as recited in claim 5 wherein the bead engaging means assumes an elliptical configuration.

7. A self-sealing container closure as recited in claim 5 wherein the aperture is arcuate and is less than a half circle.

8. A self-sealing container closure as recited in claim 5 wherein said acute angle is between about 0.5° and 20°.

9. A self-sealing container closure as recited in claim 5 wherein said central face is substantially planar.

10. A self-sealing container closure comprising:
- a generally central raised face having an aperture therethrough defined by overlapping edges,
- a resilient skirt extending from the periphery of the central raised face, said skirt having an integral bead engaging means formed on the inner face of the skirt and assuming an elliptical shape around said periphery, said means comprising a first section disposed in a first plane and a second section disposed in a second plane, said planes intersecting and subtending an acute angle of between about 0.5° and 20° when the closure is not secured to the container and parallel or coextensive with one another when the closure is secured to the container.

11. A self-sealing container closure as recited in claim 10 wherein there is provided a recess between said skirt and said central raised face.

12. A self-sealing container closure as recited in claim 10 wherein the central face is substantially planar.

13. A self-sealing container closure as recited in claim 10 wherein there is at least one rib connecting said skirt and said central raised face.

14. A self-sealing container closure as recited in claim 10 wherein the container lid is made from a plastic material and the acute angle is about 0.5° to about 5.0°.

15. A self-sealing container closure comprising:
- a generally central raised face having an aperture therethrough defined by overlapping edges, said face being substantially planar,
- a resilient skirt extending from the periphery of the central raised face, a recess connecting said skirt and said central raised face, said skirt having an integral bead engaging means formed on the inner face of the skirt and assuming an elliptical shape around said periphery, said means comprising a first section disposed in a first plane and a second section disposed in a second plane, said planes intersecting and subtending an acute angle of between about 0.5° and about 5° when the closure is not secured to the container and parallel or coextensive with one another when the closure is secured to the container.

16. A self-sealing container closure as recited in claim 15 wherein there is at least one rib connecting said skirt to said central raised face.

*17. A self-sealing container closure comprising:*
- *a central face having an aperture therethrough defined by adjoining edges, a skirt extending from the periphery of the central face, said skirt having an integral engaging means formed on the inner surface of the skirt for seating engagement with a rim portion of a container, said means including an integral skirt member, said member having two adjacent sections, one section being disposed in one plane and the other section disposed in a second plane, said planes intersecting at an acute angle.*

*18. An integrally formed self-sealing container closure comprising:*

*a central face having an aperture therethrough defined by adjoining edges, a skirt extending from the periphery of the central face, said skirt having an integral engaging means formed on the inner face of the skirt for seating engagement with a rim portion of a container, said means including an integral skirt member, said member having two adjacent sections, one section being disposed in one plane and the other section being disposed in a second plane, said planes intersecting at an acute angle, and said planes being brought into substantial alinement when said closure is affixed to said container to thereby bias said edges into engagement with one another.*

* * * * *